United States Patent Office 3,147,232
Patented Sept. 1, 1964

3,147,232
STABILIZERS FOR VINYL CHLORIDE POLYMER COMPOSITIONS COMPRISING ALKALINE EARTH METAL COMPOUNDS
George R. Norman, Lyndhurst, and William M. Le Suer, Cleveland, Ohio, assignors to The Lubrizol Corp., Wickliffe, Ohio, a corporation of Ohio
No Drawing. Filed Mar. 20, 1961, Ser. No. 96,730
8 Claims. (Cl. 260—23)

This invention relates to novel plastic compositions which have an enhanced stability with respect to the effects of heat and light. In a more particular sense it relates to compositions containing relatively large amounts of alkaline earth metals which are capable of imparting to plastic compositions the above-mentioned stability.

The particular plastic compositions which are benefited most by the stabilizing action of the compositions of this invention are those which contain chlorine attached to an aliphatic carbon atom. Such plastic substances are represented by polymers of vinyl chloride. Such polymers have a tendency to decompose, especially at elevated temperatures, with the evolution of hydrogen chloride. Such decomposition is undesirable for a variety of reasons, but particularly because it is associated with a darkening of the color of the plastic material.

The use of minor amounts of additives for their stabilizing action with respect to such decompositions has been known for some time and these additives are for the most part presumed to act in such a manner as to inhibit the evolution of hydrogen chloride. This presumption is based upon the fact that many of the effective additives are basic.

It is a principal object of the present invention to provide novel compositions which may be useful as stabilizers of chlorine containing polymeric materials.

It is also an object of the present invention to provide plastic compositions having enhanced stability toward heat and light.

These and other objects are accomplished by the process of preparing oil-soluble compositions containing large amounts of alkaline earth metal which comprises preparing a mixture of (A) An alcohol,
(B) An aliphatic monocarboxylic acid, and
(C) More than one equivalent of a basic alkaline earth metal compound per equivalent of said acid compound, and treating said mixture with an acidic gas to reduce the basicity thereof.

The process is carried out by mixing the reactants, as indicated, generally with stirring and heating to insure thorough mixing. A small amount of water usually is incorporated into the mixture to assist in the dispersion of the alkaline earth metal compound. Any such water should be removed from the mixture before the step of treating with an acidic gas. The presence of an appreciable proportion of water in the mixture during this step sometimes results in the formation of a product which is not easily filtered, or which has poor clarity, or which contains less than the desired amount of metal. The water may be removed simply by heating the mixture, usually at the temperature above 100° C.

The step of treating the mixture with an acidic gas is carried out preferably at elevated temperatures, e.g., above 100° C. A particularly convenient method of carrying out the process involves the addition of water to the mixture, as indicated above, stirring and heating to insure an intimate mixture of reactants, heating this mixture to a temperature above 100° C. to remove the water, and then bubbling an acidic gas through this heated mixture.

The step of treating the mixture of reactants with an acidic gas serves two purposes: the basicity of the mixture is reduced, and in many instances the amount of metal in the oil-soluble product is increased in direct proportion to the extent of treatment with such acidic gas. In other words, the acidic gas appears to solubilize metal which otherwise is oil-insoluble.

COMPONENT A

Alcohols which are suitable for use in the process of this invention include principally the aliphatic alcohols. Aromatic-substituted alcohols are suitable in some instances, i.e., the lower molecular weight aromatic-substituted alcohols, such as benzyl alcohol, β-phenylethyl alcohol, etc., but ordinarily these are not cheap enough to compare favorably with other available alcohols. Particularly contemplated for use in the process here are those alcohols such as methyl, ethyl, n-propyl, isopropyl, n-butyl, sec-butyl, isobutyl, isoamyl, n-hexyl, heptyl, n-octyl, isooctyl, nonyl, 2-ethylhexyl, decyl, lauryl, and higher aliphatic alcohols. An especially suitable class of aliphatic alcohols for use in this process are those having from 1 to 12 carbon atoms.

The amount of alcohol which may be used in the process is not critical. It is important, of course, to use sufficient, and a minimum amount is about 0.1 equivalent (i.e., 0.1 mole of a monohydric alcohol) per equivalent of the monocarboxylic acid of Component B. Ordinarily, from about 0.5 equivalent up to about 10 equivalents of an alcohol per equivalent of aliphatic monocarboxylic acid is employed. Larger amounts, up to 20 or 25 equivalents of alcohol may be used, especially in the case of the lower molecular weight alcohols.

COMPONENT B

The carboxylic acids contemplated for use in this process include principally the fatty acids. In some cases lower molecular weight aliphatic carboxylic acid may be used, and also, in some cases, higher molecular weight carboxylic acids may be used. Thus, acids derived from the oxidation of paraffin wax may be used. Ordinarily, however, fatty acids are best suited for the purposes of this invention. These are illustrated by lauric acid, palmitic acid, oleic acid, linoleic acid, linolenic acid, oleostearic acid, stearic acid, myristic acid, and undecylenic acid. The carboxylic acids may contain elements other than carbon, hydrogen, and oxygen, e.g., α-chlorostearic acid, a-nitrolauric acid, etc.

COMPONENT C

The alkaline earth metal compounds include principally the oxides and hydroxides, and in some instances the sulfides of barium, calcium, strontium, and magnesium. Barium oxide and barium hydroxide are preferred.

It is important that an excess of the alkaline earth metal compound be used, with respect to the amount of carboxylic acid used in the process. Thus, if one mole of a carboxylic acid compound is used, then more than 0.5 mole of the basic alkaline earth metal compound must be used. Preferably, a substantially excessive amount (stoichiometrically) of the basic alkaline earth metal compound should be used. Within rather wide limits, the basicity of the product which results depends upon the amount of such "excess" alkaline earth metal compound used. The degree to which such excess metal is found in the product may be described in terms of a "metal ratio" which, as used herein, indicates the ratio of total alkaline earth metal in the oil-soluble composition to the amount of aliphatic carboxylic compound used in the process, on an equivalent basis. An oil-soluble composition, for example, having four equivalents of barium and one equivalent of oleic acid has a metal ratio of four. An oil-soluble composition having 3.8 equivalents of calcium and 1.9 equivalents of palmitic acid has a metal ratio of two.

As much as 15 equivalents of basic alkaline earth metal compound, per equivalent of aliphatic carboxylic acid, may be employed with success in this process. Ordinarily there is no need to use more than four or five equivalents of alkaline earth metal compound, per equivalent of aliphatic carboxylic acid, for the purposes of stabilizing vinyl chloride polymers, but in some instances it may be found desirable to use larger amounts.

ACIDIC GAS

The acidic gas most commonly employed in the process is carbon dioxide. In some instances it may be desirable to use sulfur dioxide, sulfur trioxide, nitric oxide, and others, but most usually carbon dioxide is to be preferred.

The amount of acidic gas which is used in the process depends in some respects upon the desired basicity of the particular product in question. Thus, in the case of a highly basic product only a small amount of acidic gas will be required. Ordinarily, however, a less basic product is desired and in such instances a larger amount of acidic gas is used. A particularly preferred product is one in which the basicity has been substantially neutralized, e.g., one in which the neutralization number is less than about 10. The preparation of such a neutral product entails the use of a rather large amount of acidic gas, i.e., more than 25 percent by weight of the amount of the metal carboxylate which is being so treated. Generally, more than the theoretical quantity of acidic gas is required to achieve any desired degree of basicity in a particular product.

In some instances a more basic product may be acceptable and the preparation of such products will require the use of only 10–25 percent by weight of acidic gas, based on the barium carboxylate being treated.

The treatment of the above-described process mixture with acidic gas appears to have two quite beneficial effects. It has a clarifying effect on both the process mixture and on the ultimate product, and it allows the incorporation of significantly more metal into the oil-soluble product. It is apparent that this latter effect can be realized only when there is present in the reaction mixture an appreciable quantity of oil-insoluble metal base. Thus, it is important for the incorporation of the maximum amount of metal that the process mixture not be separated (as, e.g., by filtration) from oil-insoluble alkaline earth metal base before carbonation.

The following examples illustrate some of the details of the process of this invention.

*Example 1*

A mixture of 300 grams of mineral oil, 99 grams (0.76 equivalent) of octyl alcohol, 257 grams (3.36 equivalents) of barium oxide, 234 grams (0.81 equivalent) of oleic acid, and 45 grams (5 equivalents) of water is heated with stirring to reflux temperature in about 1 hour. The mixture then is heated to a temperature of 135°–145° C., and maintained at this temperature for a period of about 0.5 hour. This mixture is treated with $CO_2$ (2 cubic ft. per hour) at 145° C. for a period of about 2 hours. The resulting mixture is heated to 190° C. and filtered. The filtrate has the following analysis:

Sulfate ash _____ 34.5%.
Metal ratio _____ 2.9.
Neut. No. _____ 0.4 (acidic).

*Example 2*

A mixture of 897 grams of mineral oil, 190 grams (1.15 equivalents) of octyl alcohol, 386 grams (4.88 equivalents) of barium oxide, 347 grams (1.22 equivalents) of stearic acid, and 67 grams (7.4 equivalents) of water is heated with stirring to reflux temperature in about 1 hour. The mixture then is heated to a temperature of 145° C., and maintained at this temperature for a period of about 0.5 hour. This mixture is treated with $CO_2$ (2.5 cubic ft. per hour) at 145° C. for a period of about 1.5 hours and then heated to 190° C. and filtered. The filtrate has the following analysis:

Sulfate ash _____ 25.87%.
Metal ratio _____ 3.1.
Neut. No. _____ 0.3 (acidic).

*Example 3*

A mixture of 2576 grams of mineral oil, 240 grams (1.85 equivalents) of octyl alcohol, 740 grams (20.0 equivalents) of calcium hydroxide, 2304 grams (8 equivalents) of oleic acid, and 392 grams (12.3 equivalents) of methyl alcohol is heated with stirring to a temperature about 50° C. in about 0.5 hour. This mixture then is treated with $CO_2$ (3 cubic ft. per hour) at 50°–60° C. for a period of about 3.5 hours. The resulting mixture is heated to 150° C. and filtered. The filtrate has the following analysis:

Sulfate ash _____ 24.1%.
Metal ratio _____ 2.5.
Neut. No. _____ 2.0 (acidic).

*Example 4*

A mixture of 932 grams of mineral oil, 100 grams (0.77 equivalent) of octyl alcohol, 370 grams (10.0 equivalents) of calcium hydroxide, 287 grams (1.0 equivalent) of oleic acid, and 150 grams (4.6 equivalents) of methyl alcohol is heated with stirring to a temperature of about 55° C. in about 0.5 hour. This mixture then is treated with $CO_2$ (2 cubic ft. per hour) at 55° C. for a period of about 6 hours. The resulting mixture is heated to 150° C. and filtered. The filtrate has the following analysis:

Sulfate ash _____ 30.6%.
Metal ratio _____ 7.5.
Neut. No. _____ 3.0 (basic).

*Example 5*

A mixture of 1800 grams of mineral oil, 598 grams (4.6 equivalents) of octyl alcohol, 952 grams (18.3 equivalents) of strontium oxide, 1376 grams (4.88 equivalents) of oleic acid, and 249 grams (27.7 equivalents) of water is heated with stirring to the reflux temperature in about 1.5 hours. The mixture is then heated to a temperature of 145° C., and maintained at this temperature for a period of about 0.5 hour. This mixture is treated with $CO_2$ (4 cubic ft. per hour) at 145° C. for a period of about 1 hour.

The compositions which may be prepared by the process of this invention are readily adaptable for use as stabilizers in plastic formulations. Such compositions provide an alkaline reserve which appears to be effective in the inhibition of decomposition of the plastic material. This effectiveness is observable over a long period of time and under conditions of elevated temperature.

The thermal stability of the plastic compositions contain the compositions described herein as shown by storage tests at elevated temperatures. Various products as prepared in the above examples were tested by milling them into a plastic composition containing 68 parts of a polyvinyl chloride powder, 28.6 parts of di-2-ethylhexyl phthalate (plasticizer), 3.4 parts of epoxidized soy bean oil (plasticizer), and 0.05% (as cadmium) of cadmium 2-ethylhexoate, for ten minutes at 150–160° C. In each instance a substantially colorless, flexible sheet was obtained. These sheets were placed in an oven, maintained at 180° C., and withdrawn at 15-minute intervals for inspection and testing in a Photovolt Reflexion Meter (ASTM Designation: D 1260–53T). The tests results were a measure of the change in color of a particular sheet. A darkening in color is regarded as evidence of thermal degradation. The test results are reflectometer readings and are thus a direct measure of the whiteness of a test sheet. A rating of 70 to 100 (on a scale of 0 to 100)

indicates a substantially clear plastic sheet whereas a rating of 1 or 2 indicates an orange-light yellow color.

A white enamel surface was used as the standard, i.e., a rating of 100.

REFLECTOMETER READINGS
*Percent of Light Reflected Using a White Enamel Standard*

| Plastic Sheet | Additive | Minutes in Oven at 180° C. | | |
|---|---|---|---|---|
| | | 0 | 15 | 30 |
| A | | 83 | 46 | 19 |
| B [1] | | 83 | 51 | 18 |
| C | 0.25% of product of Ex. 1 | 86 | 81 | 49 |
| D | 0.70% of product of Ex. 3 | 83 | 67 | |

[1] Contained 0.1% (as cadmium) of cadmium 2-ethylhexoate.

It will be noted from the above-tabulated data that the plastic sheets which do not contain the additive of this invention, become discolored faster than those which have been stabilized by the addition of small amounts of the product prepared by the process described herein. Plastic sheet A, for example, had a color rating of 19 after 30 minutes of heating at 180° C. whereas plastic sheet C, differing only in the presence of 0.25% by weight of the product of Example 1, had a color rating of 49 after 30 minutes at this same temperature.

The stable plastic compositions of this invention contain a minor proportion of a product prepared by the process described and illustrated earlier. Very small amounts of such a product have been observed to be effective in enhancing the stability, particularly the thermal stability, of a polymeric composition. A particularly preferred range of concentration of the stabilizing agent of this invention is from about 0.1 to about 5.0 percent by weight based on the weight of the polymer in the stable composition. Thus for every 100 parts of a polymer it has been found that a concentration of the product of the process of this invention of more than 0.1 part is sufficient to stabilize such a polymer for most commercial applications, and ordinarily a concentration of more than 5.0 parts contributes no further stability to the composition.

The compositions which result from the process of this invention are useful as stabilizers not only for polymers of vinyl chloride including copolymers thereof, but also as effective stabilizers of other polyolefins. Thus they may be used as stabilizers for polyethylene, polyisobutylene, polystyrene, polyvinyl chloride, polyvinylidene chloride, copolymers of vinyl chloride with vinyl acetate, ethylene, diethyl fumarate, dibutyl maleate, vinylidene chloride and the like, copolymers of isobutylene with isoprene, butadiene, styrene and the like, copolymers of vinylidene chloride with diethyl maleate, methyl acrylate, acrylamide vinyl acetate and the like.

The stabilizing action of these compositions is enhanced by the use also of cadmium salts of carboxylic acids. Examples of such cadmium salts include principally cadmium naphthenate, cadmium laurate. cadmium oleate, etc.

This application is a continuation-in-part of application Ser. No. 858,603, filed December 10, 1959, which application is in turn a continuation-in-part of application Ser. No. 410,461, filled February 15, 1954, and now abandoned.

What is claimed is:
1. A vinyl chloride polymer composition containing a stabilizing proportion of a product prepared by the process which comprises preparing a mixture of
   (A) at least about 0.1 equivalent of an alcohol selected from the class consisting of aliphatic alcohols and lower molecular weight aromatic substituted aliphatic alcohols,
   (B) an equivalent of an aliphatic monocarboxylic acid having from 12 to 20 carbon atoms,
   (C) more than one equivalent of a basic alkaline earth metal compound per equivalent of said acid compound,
and treating said mixture with carbon dioxide to reduce the basicity thereof.

2. The composition of claim 1 characterized further in that the alkaline earth people compound is barium oxide.

3. The composition of claim 2 characterized further in that it contains a stabilizing proportion of cadmium 2-ethyl hexoate.

4. The composyition of claim 1 wherein the aliphatic monocarboxylic acid compound is a fatty acid.

5. The composition of claim 4 characterized further in that the aliphatic alcohol is octyl alcohol.

6. The composition of claim 4 characterized further in that the alcohol contains from one to twelve carbon atoms.

7. The composition of claim 4, wherein the alkaline earth metal compound is calcium hydroxide.

8. The composition of claim 7 characterized further in that it contains a stabilizing proportion of a cadmium salt of a carboxylic acid.

References Cited in the file of this patent
UNITED STATES PATENTS
2,968,642    Le Suer _____ Jan. 17, 1961